(12) United States Patent
Cieślikowski et al.

(10) Patent No.: US 8,869,969 B2
(45) Date of Patent: Oct. 28, 2014

(54) METHOD AND UNIT FOR FEEDING BEADS

(71) Applicant: International Tobacco Machinery Poland Sp. z o.o., Radom (PL)

(72) Inventors: Bartosz Cieślikowski, Radom (PL); Jacek Figarski, Radom (PL); Radoslaw Figarski, Radom (PL); Kazimierz Makosa, Radom (PL)

(73) Assignee: International Tobacco Machinery Poland Sp. z o.o., Radom (PL)

( * ) Notice: Subject to any disclaimer, the term of this patent is extended or adjusted under 35 U.S.C. 154(b) by 0 days.

(21) Appl. No.: 13/735,003

(22) Filed: Jan. 6, 2013

(65) Prior Publication Data

US 2013/0180827 A1 Jul. 18, 2013

(30) Foreign Application Priority Data

Jan. 18, 2012 (PL) .......................................... 397839

(51) Int. Cl.
*B65G 59/00* (2006.01)
*B65G 29/00* (2006.01)
*A24D 3/02* (2006.01)

(52) U.S. Cl.
CPC .............. *B65G 29/00* (2013.01); *A24D 3/0216* (2013.01)
USPC ........ 198/479.1; 221/120; 221/132; 221/277; 493/49

(58) Field of Classification Search
USPC ......... 198/479.1, 617; 221/89, 120, 121, 122, 221/132, 277; 493/39, 49; 131/87
See application file for complete search history.

(56) References Cited

U.S. PATENT DOCUMENTS 611,302 A * 9/1898 Weiss .............................. 221/68
3,817,423 A * 6/1974 McKnight ..................... 198/392
(Continued)

FOREIGN PATENT DOCUMENTS

| WO | 2009071271 A1 | 6/2009 |
| WO | 2009071272 A1 | 6/2009 |
| WO | 2012057255 | 5/2012 |

OTHER PUBLICATIONS

European Search Report in Application No. EP 13 15 0095 dated May 29, 2013.

(Continued)

*Primary Examiner* — Douglas Hess
(74) *Attorney, Agent, or Firm* — Oppedahl Patent Law Firm LLC

(57) ABSTRACT

The subject matter of the application is a method of feeding beads in the tobacco industry system, in a unit for transferring a stream of beads (2), from receiving pockets (18) to outfeeding pockets (21, 21'), where the beads are transferred along guiding grooves (5A, 5B, 6A, 6B, 6C) disposed on guiding plates (5, 5', 6, 6'), comprising the steps in which: the beads are fed to a guiding chamber (22, 22', 22") formed at the intersection of the guiding groove (5A, 5B) of the first guiding plate (5, 5') and the guiding groove (6A, 6B, 6C) of the second guiding plate (6, 6'); at least one guiding plate is rotated relative to the second guiding plate, which forces the movement of the guiding chamber (22, 22', 22") so that the distance of the guiding chamber (22, 22', 22") to the axis of rotation of the guiding plates changes; the beads are conveyed from the guiding chamber (22, 22', 22") to the outfeeding pocket (21, 21'). The subject matter of the application is also a device for the implementation of the method.

4 Claims, 10 Drawing Sheets

(56) References Cited

U.S. PATENT DOCUMENTS

Figure 1:
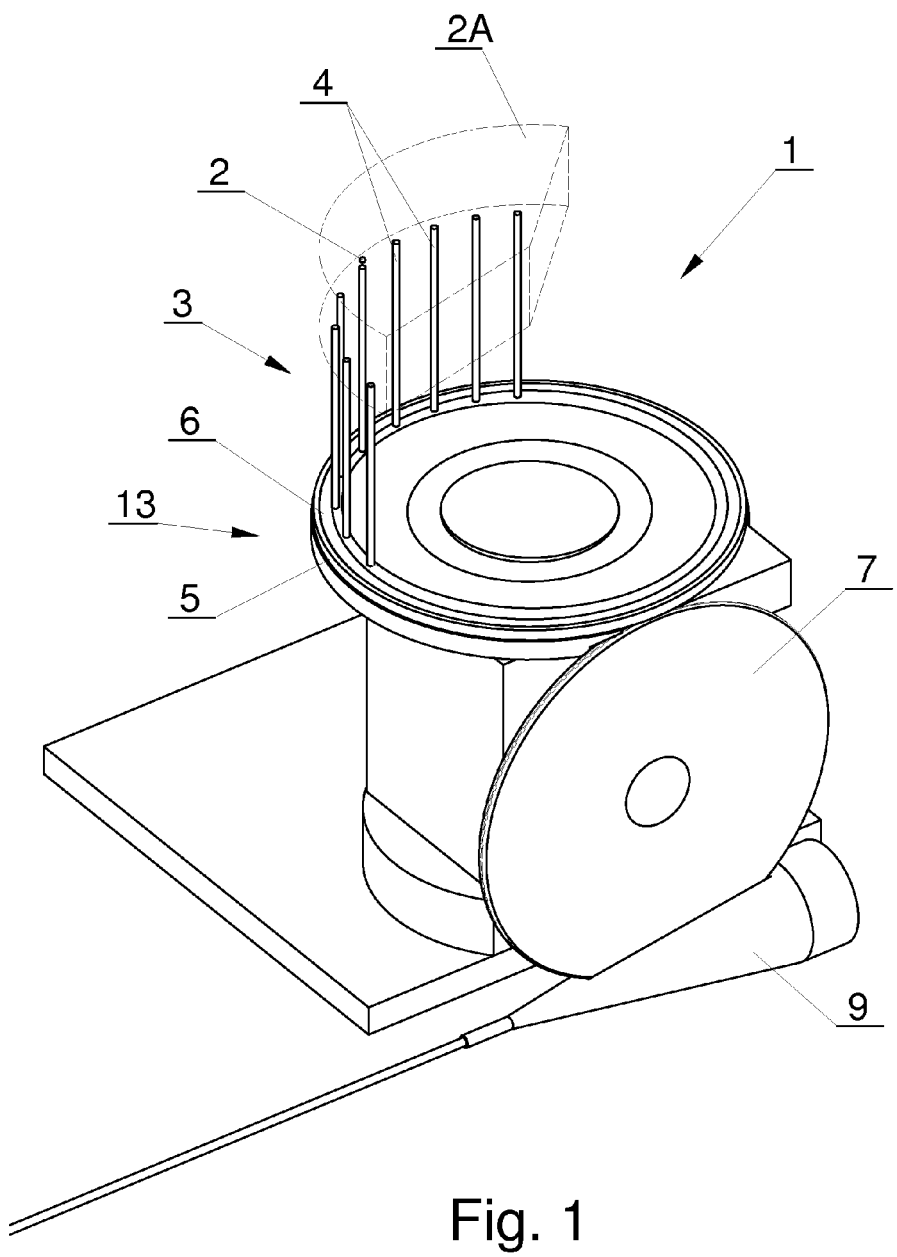

| | | | |
|---|---|---|---|
| 3,986,636 A * | 10/1976 | Hoppmann et al. | 221/7 |
| 4,144,970 A * | 3/1979 | McKnight et al. | 209/542 |
| 5,865,342 A * | 2/1999 | Ito et al. | 221/265 |
| 7,833,146 B2 * | 11/2010 | Deal | 493/49 |
| 7,975,877 B2 * | 7/2011 | Garthaffner et al. | 221/211 |
| 8,381,947 B2 * | 2/2013 | Garthaffner et al. | 221/72 |
| 8,512,213 B2 * | 8/2013 | Deal | 493/48 |
| 2004/0020554 A1 | 2/2004 | Smith et al. | |
| 2010/0099543 A1 | 4/2010 | Deal | |
| 2011/0053745 A1 | 3/2011 | Iliev et al. | |

OTHER PUBLICATIONS

Polish Search Report in priority application No. P.397839 dated May 24, 2012.

* cited by examiner

METHOD AND UNIT FOR FEEDING BEADS

The object of the application is a method and a unit for feeding beads used in the filters of the tobacco industry products, particularly cigarettes.

This invention concerns the feeding of spherical or oval objects which are subsequently placed into the filter material. For reasons of simplification, such objects will be hereinafter referred to as beads. Known products on the market are cigarettes the filters of which are provided with beads containing aromatic or flavour substances. The substances contained in the beads are released during smoking or yet before lighting up a cigarette by squeezing the filter resulting in crushing of the bead.

In the production process, a problem which is difficult to solve and at the same time very significant is the feeding of individual beads to a machine forming filters at high speeds in a way which guarantees that the beads remain undamaged and a high feeding efficiency is maintained, i.e. each manufactured filter actually contains a bead.

In known bead feeders, channels for feeding the beads to the area from which they are transferred to a bead delivery wheel are used, with the function of the said wheel to place the delivered beads into the filter material.

In the U.S. Pat. No. 7,975,877 B2 a bead feeder is disclosed in which the bead feeding unit is provided with a plurality of radially arranged channels connected with a bowl, where the channels rotate with the bowl, and the beads are picked up by vacuum transfer by a bead transfer wheel from pockets situated at the outlets of the channels, and then transferred to a bead delivery wheel.

The document WO 2009/071271 has disclosed a bead feeder in which the bead feeding unit is provided with passageways rotating with the bowl, where the beads are fed to a bead delivery wheel after separating the lowermost bead from those situated above it using a stationary arched wedge-ended element.

The document WO 2009/071272 has disclosed a similar bead feeder, where the beads are fed to a bead delivery wheel using two plates having a plurality of openings and rotating relative to each other, and a bead is fed after aligning respective openings directly on top of each other.

The U.S. Pat. No. 7,833,146 B2 shows a device for feeding beads by curved channels from a bowl directly to a bead delivery wheel, where the channels rotate with the bead bowl, and the beads are picked up from the bowl by vacuum transfer.

In the devices presented above, the beads are transferred from holding pockets of the supply channels to transfer wheels or to a wheel delivering the beads to the filter material. However, in case of very high efficiencies, the construction of the elements can be so complicated or can require so much space that in order to ensure correct transferring of the beads a change of the diameter on which the beads are conveyed may be necessary. A change of the diameter can be also forced by the construction of elements picking up the beads in order to transfer them to a wheel delivering the beads to the filter material.

The objective of the invention is to develop a bead stream feeding unit in which the flow of beads in the form of a plurality of streams of individual beads spaced along a first arc with a first radius is transformed into a flow of beads in the form of an arched stream of individual beads along a second arc with a second radius.

The subject matter of the invention is a method of feeding beads, in a unit for transferring a bead stream in a tobacco industry system, from receiving pockets to outfeeding pockets, where the beads are transferred along guiding grooves disposed on guiding plates, comprising steps in which: beads are fed to a guiding chamber formed at the intersection of a guiding groove of a first guiding plate and a guiding groove of a second guiding plate; at least one guiding plate is rotated relative to the second guiding plate, which forces the movement of the guiding chamber so that the distance of the guiding chamber to the axis of rotation of the guiding plates changes; beads are conveyed from the guiding chamber to a outfeeding pocket.

The subject matter of the invention is also a unit for feeding a bead stream in a machine of tobacco industry system, from receiving pockets to outfeeding pockets, through guiding grooves disposed on guiding plates. A unit according to the invention comprises two guiding plates situated on top of each other, whereas the guiding groove of the first guiding plate and the guiding groove of the second guiding plate intersect forming at least one bead guiding chamber, where at least one of the guiding plates is movable.

A unit according to the invention is characterized in that the first guiding plate is stationary.

A unit according to the invention is characterized in that a guiding channel of the first guiding plate forms a plurality of guiding chambers with a plurality of guiding channels of the second guiding plate.

A bead transfer unit according to the invention allows feeding of a bead stream in such a way that at each stage of the bead transfer the position of the beads is fully controlled, i.e. it is not possible for a bead to take a random position, which would result for example in undesirable crushing of a bead. The unit can be used in any bead feeder in which it is necessary to change the radius of the arc on which a bead stream moves. The unit makes transferring of a stream of individual beads at a speed adjusted to highly efficient filter manufacturing machines possible.

Figure 2A:
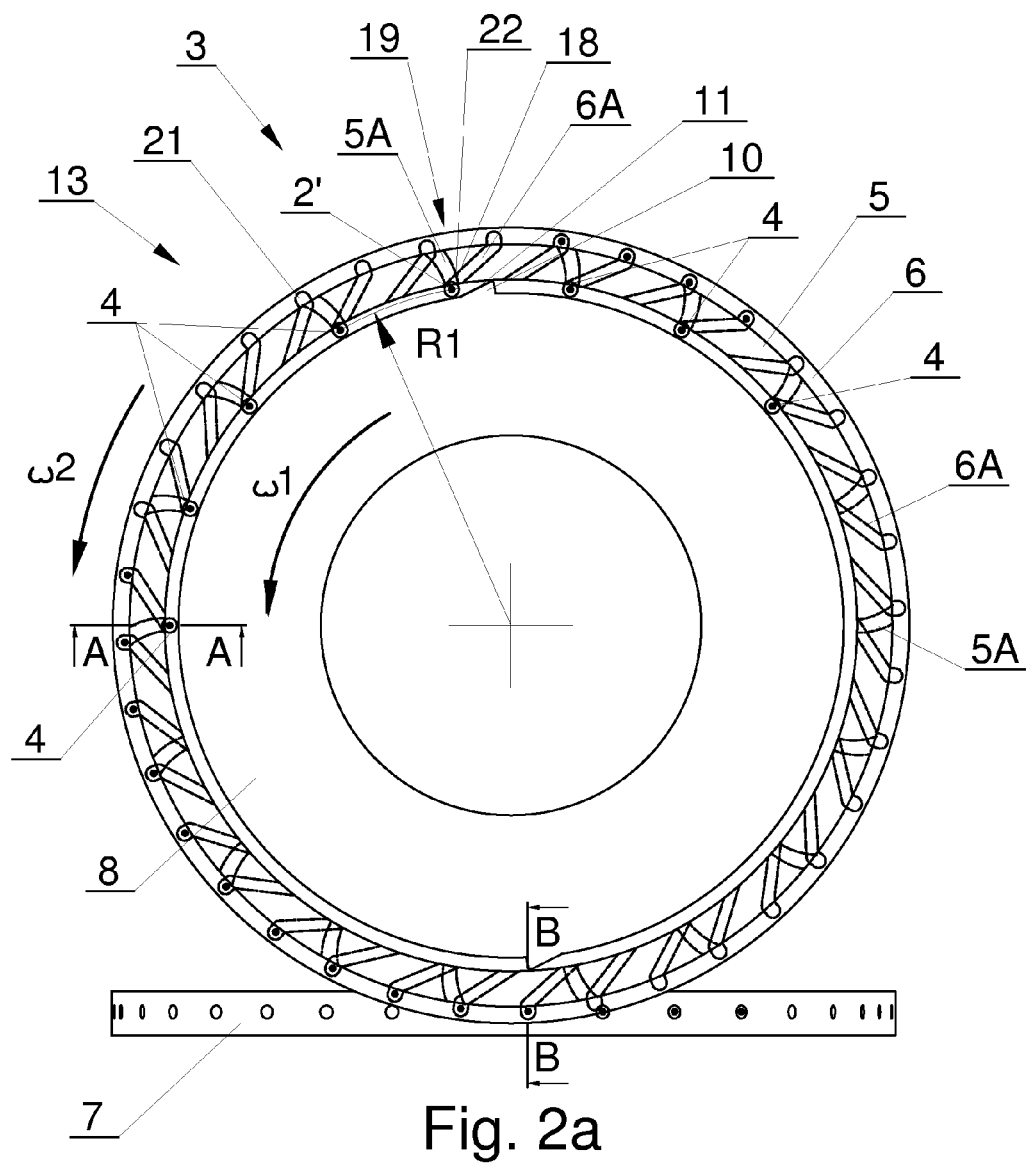
Figure 2B:
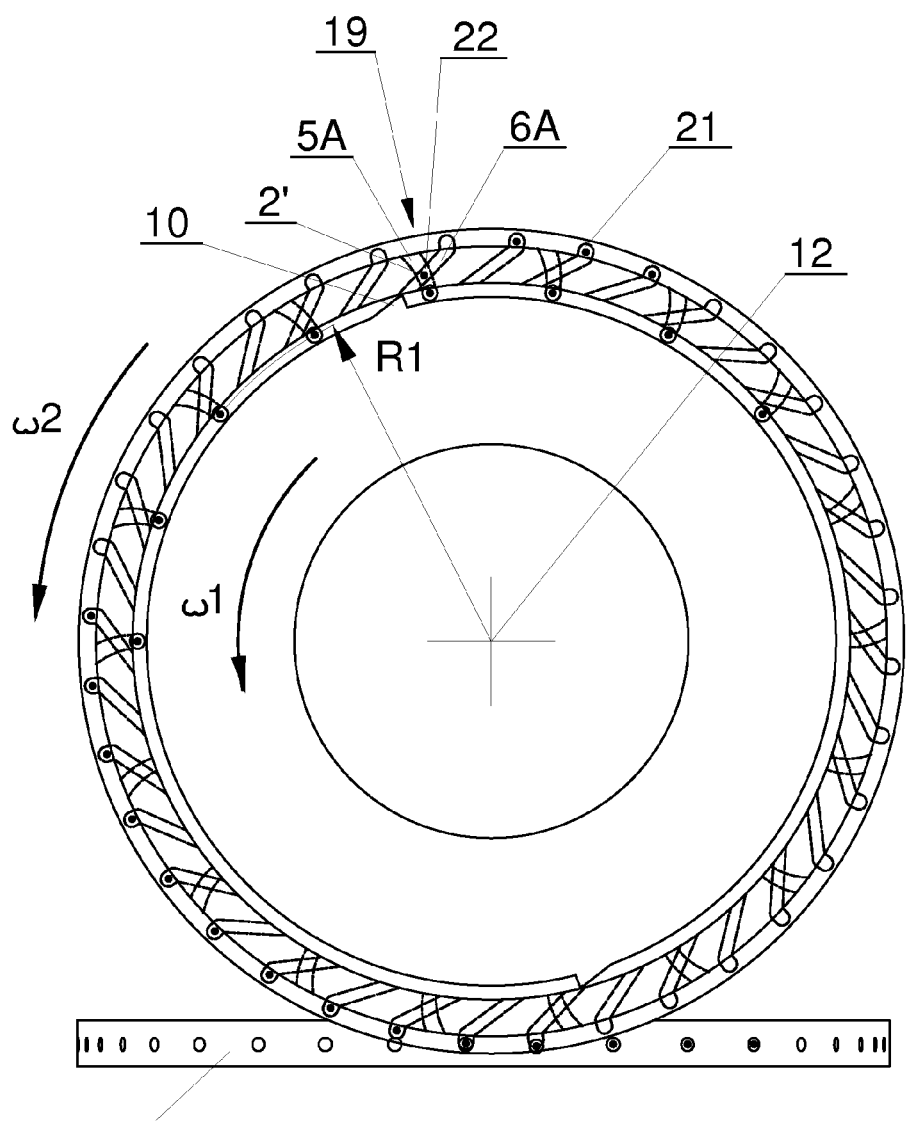
Figure 2C:
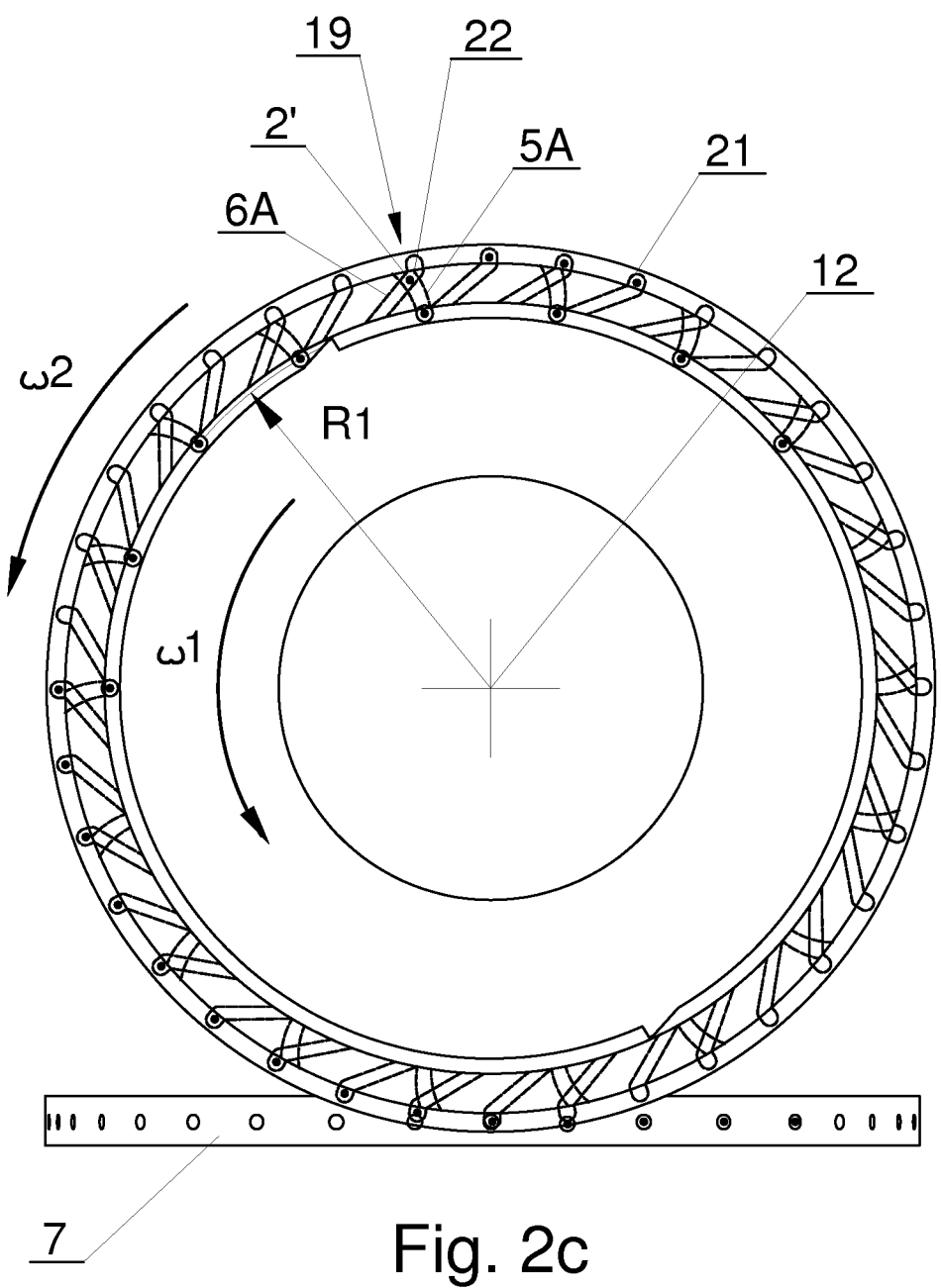
Figure 2D:
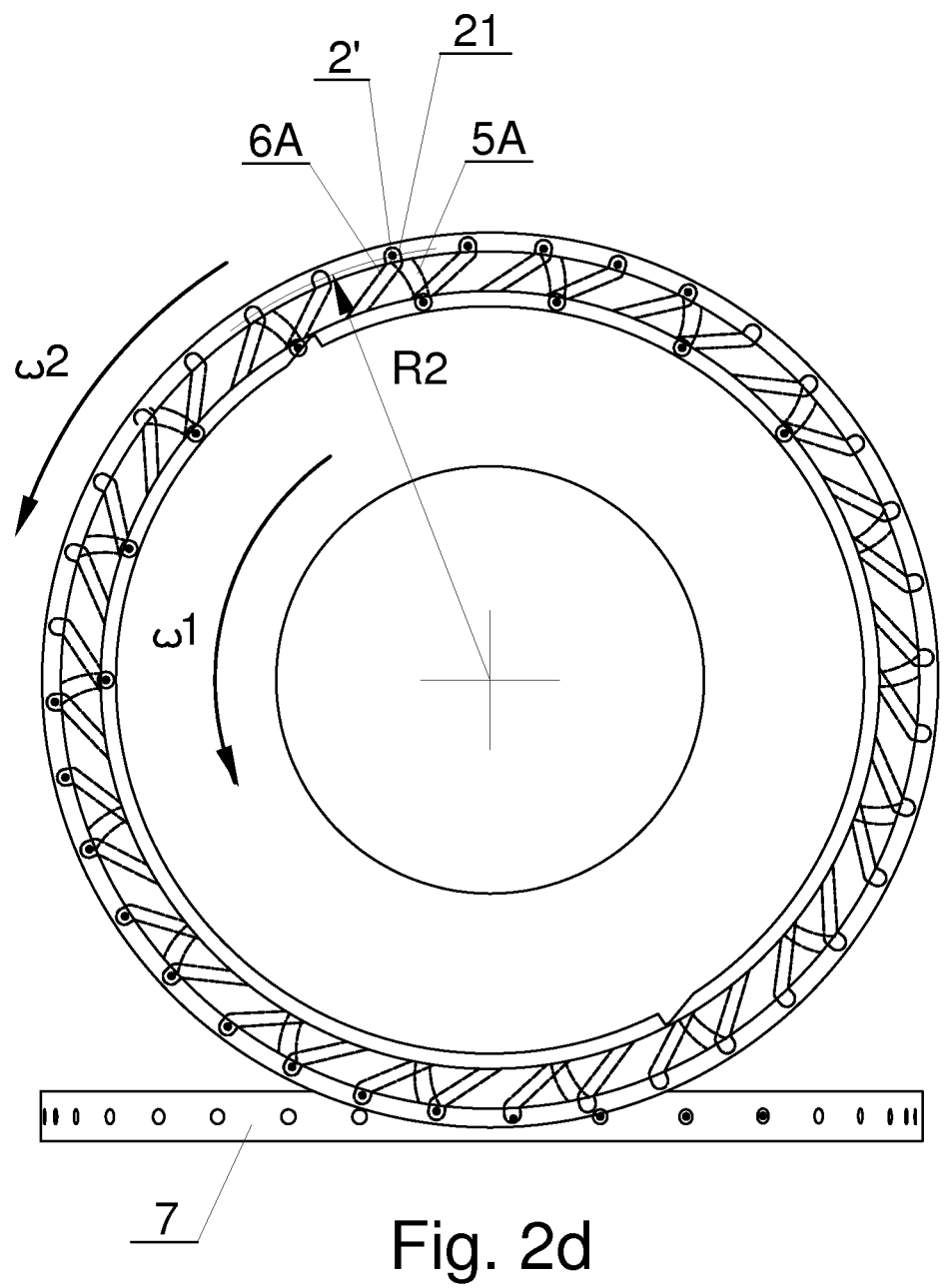
Figure 3:
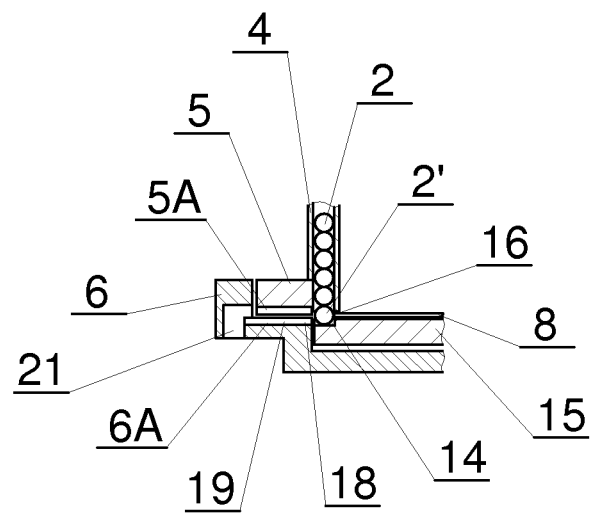
Figure 4:
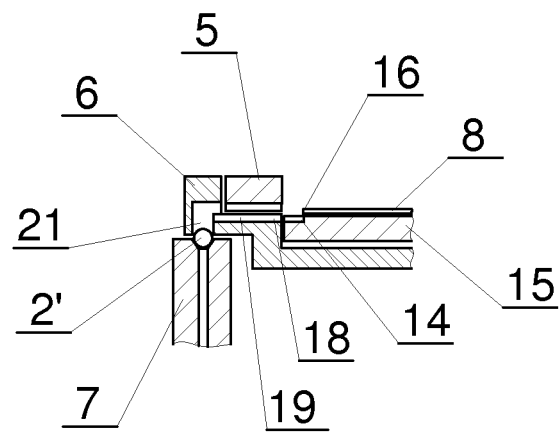
Figure 5:
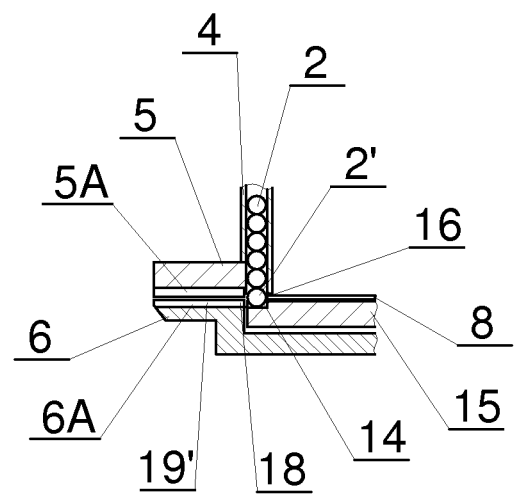
Figure 6:
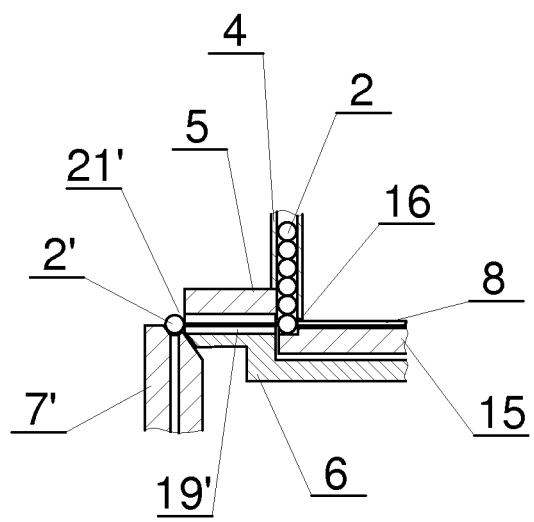
Figure 7A:
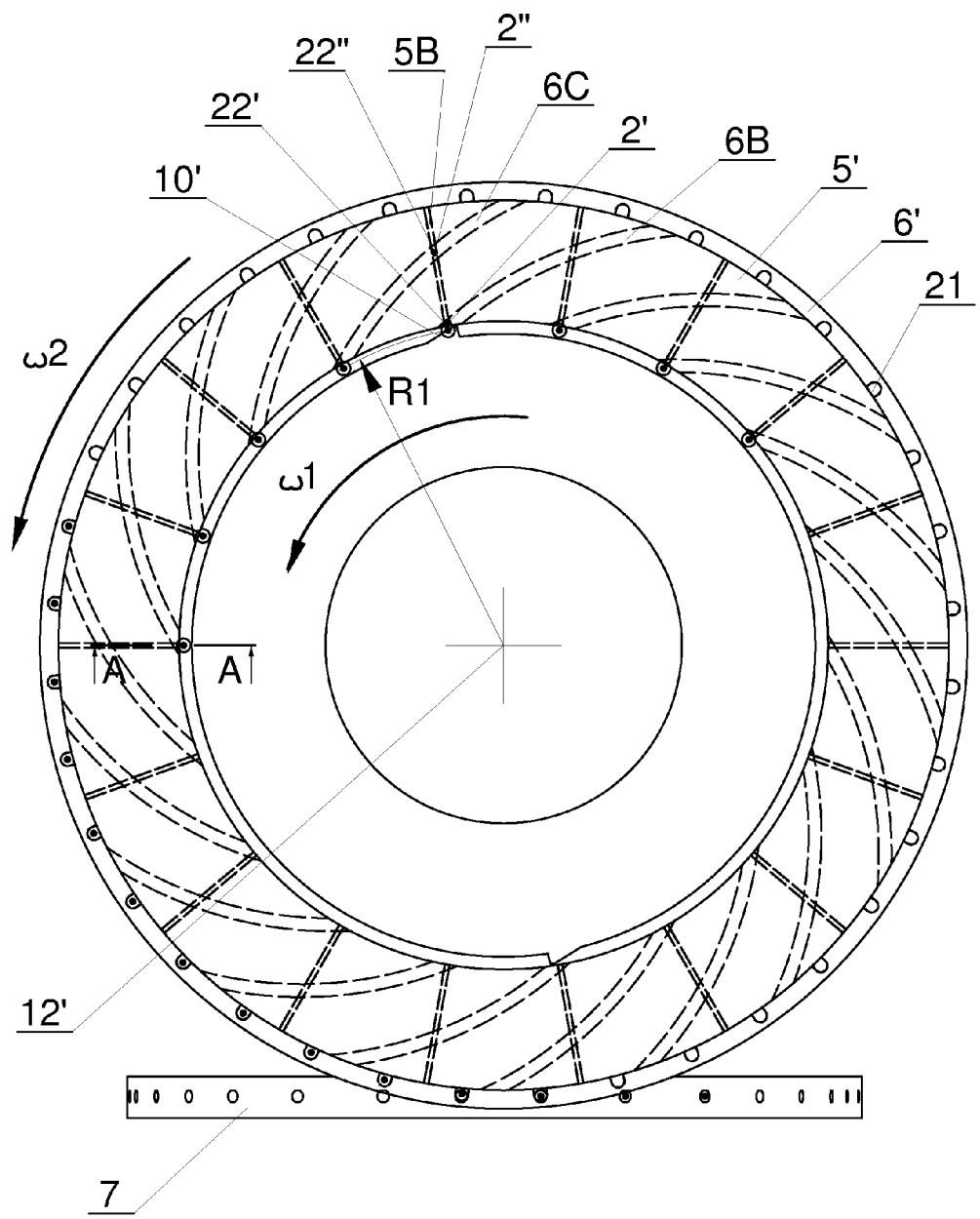
Figure 7B:
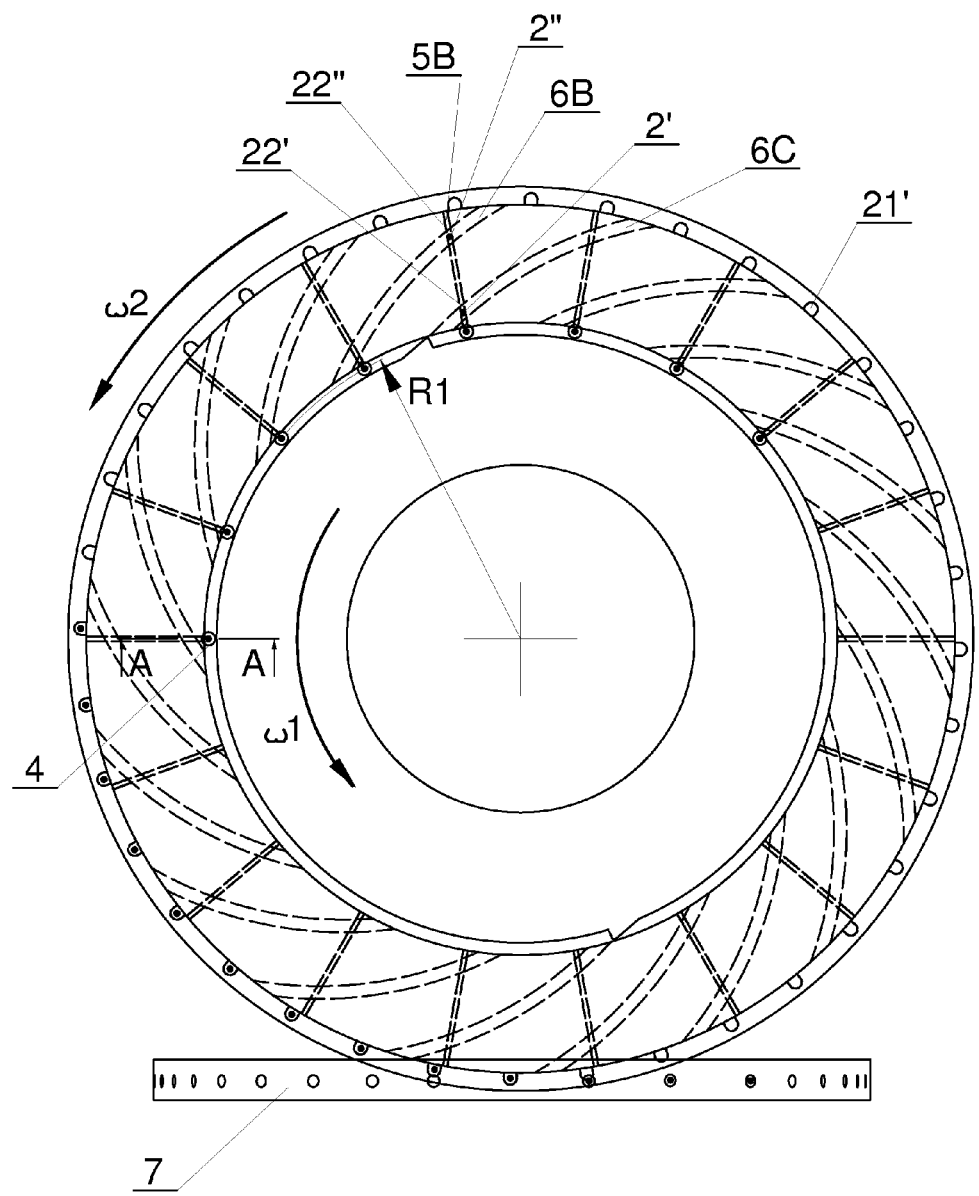
Figure 7C:
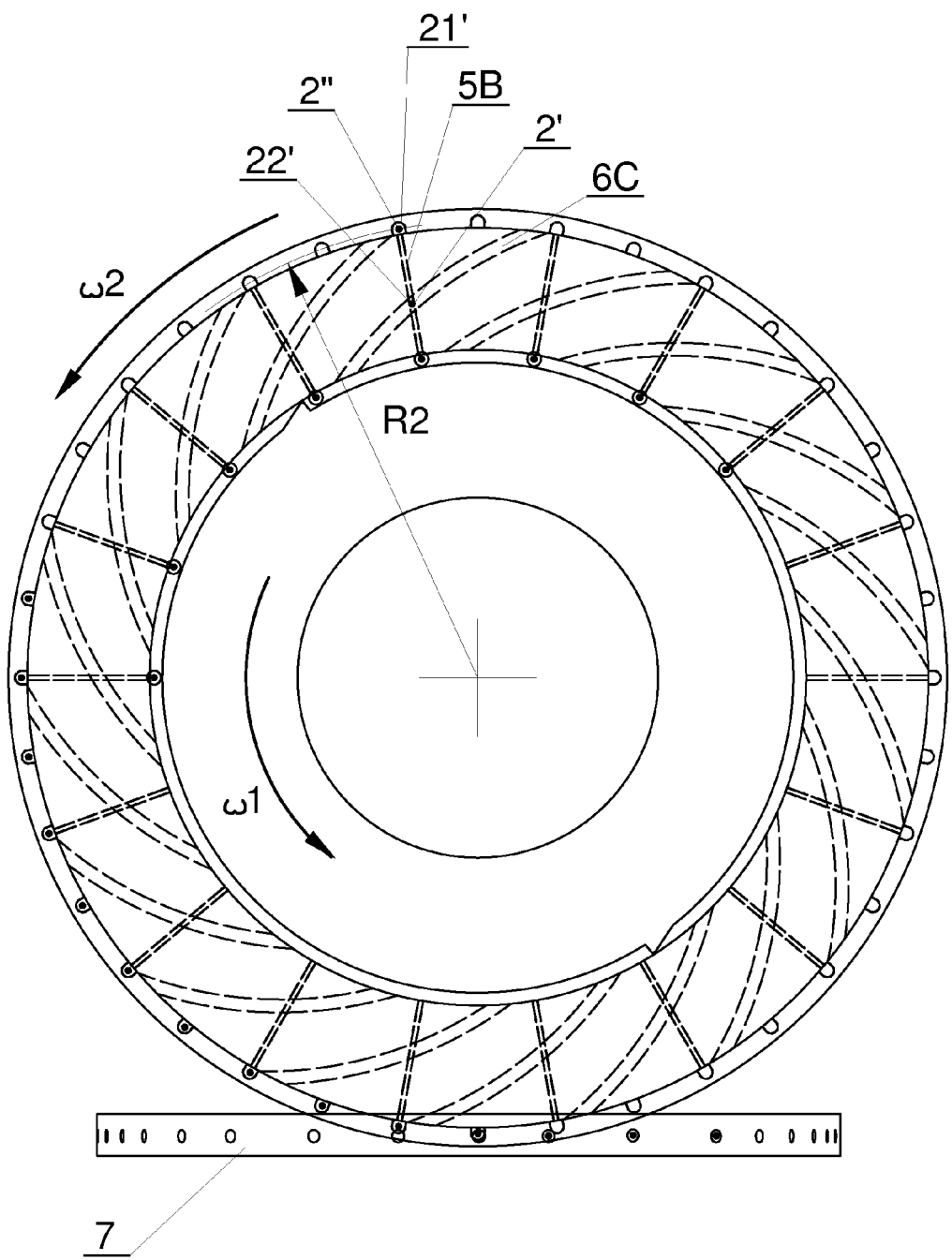

The object of the invention has been shown in a preferred embodiment in a drawing in which:

FIG. 1 shows a bead feeder in a perspective view,

FIGS. 2a to 2d show a fragment of a bead feeder in the first embodiment in a top view at successive bead transfer stages, FIG. 3 shows a sectional view of a holding pocket in the first embodiment of the guiding channel, marked in FIG. 2a as A-A, before pushing a bead out of the holding pocket, FIG. 4 shows a sectional view of the holding pocket in the first embodiment of the guiding channel, marked in FIG. 2a as B-B, after transferring a bead to the delivery wheel, FIG. 5 shows a sectional view of a holding pocket in the second embodiment of the guiding channel, marked in FIG. 2a as A-A, before the transfer of a bead, FIG. 6 shows a sectional view of the holding pocket in the second embodiment of the guiding channel, marked in FIG. 2a as B-B, after transferring a bead to the delivery wheel, FIGS. 7a to 7c show a fragment of a bead feeder in the second embodiment in a top view at successive bead transfer stages.

FIG. 1 shows a feeder 1 for beads 2 provided with a storage container 2A for beads 2, a bead stream feeding unit 3, a unit 13 for transferring the beads to a delivery wheel and the delivery wheel 7 for delivering the beads 2 into the filter material conveyed along a funnel 9. For reasons of simplification, the elements fastening individual units have not been shown.

FIG. 2a shows a fragment of a bead feeder 1 in a top view. A bead 2 feeding unit 3 is provided with a plurality of stationary channels in the form of tubes 4 spaced on an arc of the radius R1, with the said tubes being supplied from the container 2A, whereas one bead 2 above the inlet to one of the tubes has been shown. At the outlets of the tubes 4 are situated first holding pockets 14 (FIG. 3) from which the beads are transferred to second receiving pockets 18 (FIG. 4) belonging to a unit 13 for transferring the beads 2 to the delivery wheel 7, whereas the pockets are situated in the area between a first guiding plate 5 and a second guiding plate 6. After passing through a substantially horizontal guiding channel 19 between the first guiding plate 5 and the second guiding plate 6, the beads are then delivered downward to a outfeeding pocket 21 moving on an arc of the radius R2. The beads are transferred further to the pockets on the circumference of the delivery wheel 7 which places the beads into the filter material conveyed in the funnel 9. The guiding channel 19 is formed of two parts, where the guiding channel 19 should be considered as a path which a bead 2' covers between the receiving pocket 18 and the inlet of the outfeeding pocket 21. The upper part of the guiding channel 19 is defined by a guiding groove 5A shaped on the bottom side of the first guiding plate 5 oriented towards the second guiding plate 6, the lower part of the guiding channel 19 is defined by a guiding groove 6A on the top side of the second guiding plate 6 oriented towards the first guiding plate 5, whereas the grooves 5A and 6A intersect, which is described in reference to FIG. 2a.

FIG. 2a shows a fragment of a bead feeder 1 according to the invention in the first embodiment. In a top view, a fragment of the bead 2 feeding unit 3 and the unit 13 for transferring the beads 2 to the delivery wheel 7 have been shown. The unit 3 is provided with a plurality of tubes 4 (on an arc of the radius R1), whereas all tubes 4 are filled with the beads 2. For reasons of simplification, the elements fastening the tubes to the frame of the feeder 1 and the drive elements have not been shown. The bead feeding unit 3 is provided with rotatable feeding means in the form of a cam 8 comprising pushing segments 10 having pushing edges 11, whereas the cam 8 rotates around the axis of rotation 12 at the speed w1. The first plate 5 is stationary, whereas the second plate 6 is rotatable and rotates around the axis of rotation 12 at the speed w2 lower than the speed w1 of the cam 8. The guiding grooves 5A and 6A of both guiding plates 5 and 6 are shown in broken lines. At the intersection of the grooves 5A and 6A forms a guiding chamber 22 which in view of the direction of rotation of the plate 6 and the orientation of the grooves moves so that the distance of the guiding chamber 22 to the axis of rotation 12 increases between the radius R1 and R2. A solution is also possible where both plates 5 and 6 are rotatable.

FIG. 3 shows a sectional view of any tube 4, where for example in FIG. 2a the section was marked as A-A. The lowermost bead 2' in the bead 2 column is situated in the holding pocket 14 disposed at the outlet of the tube 4, limited from below by a plate 15, and on the sides by the plate 5 and a circumferential edge 16 of the cam 8.

FIG. 4 shows a sectional view marked as B-B in FIG. 2a which corresponds to a situation where the working segment 10 moving on a circular path during the rotation of the cam 8 has passed a successive pocket 14 beneath a successive tube 4 and caused pushing the bead 2' out of the holding pocket 14, and the said bead has moved to the receiving pocket 18 and was transferred further substantially horizontally in the guiding channel 19 being the path of movement of the guiding chamber 22, and then downward to the outfeeding pocket 21 and to the delivery wheel 7 on which it is held in a known way, for example by vacuum force.

FIGS. 5 and 6 show a similar transfer of an individual bead 2', where the guiding channel 19' makes feeding of the bead 2' directly to the delivery wheel 7' possible, whereas the pocket 21' is situated at the level of the guiding channel 19'.

FIGS. 2a, 2b, 2c and 2d show successive stages of the movement of the bead 2' in the guiding chamber along the guiding channel 19 (path of movement of the bead) in the first embodiment. In FIG. 2a the pushing segment 10 is in a position right in front of the bead 2' situated at the distance R1 to the axis of rotation 12, whereas the guiding chamber 22 at the intersection of the grooves 5A and 6A begins to form. In FIG. 2b the pushing segment 10 has passed the bead 2' and caused that it slid into the chamber 22 which with the rotation of the plate 6 and the groove 6A begins to move away from the axis of rotation 12, whereas at the moment of transfer of the bead the holding pocket 14 and the receiving pocket 18 were positioned substantially radially. In FIG. 2c the bead 2' still remains in the guiding chamber 22 just before feeding it to the outfeeding pocket 21. In FIG. 2d the bead 2' was placed in the outfeeding pocket 21, it will move further with the outfeeding pocket 21 moving on an arc of the radius R2 and rotating with the guiding plate 6 at the speed w2, whereas the radius of the arc R2 is greater than the radius R1. Finally, the bead will be fed to the delivery wheel 7.

FIG. 7a shows a fragment of a bead feeder in a second embodiment. The tubes 4 with the beads situated therein are spaced on an arc of the radius R1. In the first guiding plate 5' a guiding groove 5B is shaped, whereas in the second guiding plate 6' a guiding groove 6B and a guiding groove 6C are shaped, whereas the groove 5B intersects with the grooves 6B and 6C forming the chambers 22' and 22", respectively, into which the beads 2' and 2" are inserted. FIGS. 7a, 7b and 7c show the stages of the movement of the bead 2' and the bead 2" in the guiding chamber 22' and the guiding chamber 22", respectively. The guiding groove 5B shaped in the first guiding plate 5' in FIG. 7a begins to intersect with the guiding groove 6B shaped in the guiding plate 6', and at the said intersection the guiding chamber 22' begins to form. When the guiding chamber 22' being a receiving pocket is positioned substantially radially to the holding pocket 14, the bead 2' is pushed into this guiding chamber by the pushing segment 10'. The same groove 5B intersects also with the guiding groove 6C, and at the said intersection the guiding chamber 22" is formed into which earlier the bead 2" has been pushed. As shown in FIG. 7b, during the rotation of the plate 6' the beads 2' and 2" move so that their distance to the axis of rotation 12' increases between the radius R1 and R2. In FIG. 7c the bead 2" is placed into the outfeeding pocket 21' and will move further on a circle of the radius R2 together with the rotating plate 6 and will be fed to the delivery wheel 7.

In another embodiment of the device according to the invention the guiding grooves 5A and 5B can be shaped as channels with vacuum supplied. Such solution ensures that a bead does not rub against the side edges of the groove and is sort of rolled along the groove.

The invention claimed is:

1. A method of feeding beads, in a unit for transferring a stream of beads (2) in a tobacco industry system, from receiving pockets (18) to outfeeding pockets (21), where the beads are transferred along guiding grooves (5A, 5B, 6A, 6B, 6C) disposed on guiding plates (5, 6), comprising the steps in which:

beads (2) are fed to a guiding chamber (22, 22', 22") formed at the intersection of a guiding groove (5A, 5B) of a first guiding plate (5, 5') and a guiding groove (6A, 6B, 6C) of a second guiding plate (6, 6');

at least one guiding plate is rotated relative to the second guiding plate, which forces the movement of the guiding chamber (22, 22', 22") so that the distance of the guiding chamber (22, 22', 22") to the axis of rotation of the guiding plates changes;

beads are conveyed from the guiding chamber (22, 22', 22") to an outfeeding pocket (21, 21').

2. A unit for feeding a stream of beads (2) in a machine of a tobacco industry system, from receiving pockets (18) to outfeeding pockets (21, 21'), through guiding grooves disposed on guiding plates, characterized in that it comprises two guiding plates (5, 5', 6, 6') situated on top of each other, whereas a guiding groove (5A, 5B) of a first guiding plate (5, 5') and a guiding groove (6A, 6B, 6C) of a second guiding plate (6, 6') intersect forming at least one bead guiding chamber, at least one of the guiding plates (5, 5', 6, 6') being movable, and the at least one bead guiding chamber moves radially in a outwardly direction from the center axis of the guiding plates when at least one of the guiding plates is moved.

3. A unit for feeding a bead stream as in claim 2 characterized in that the first guiding plate (5, 5') is stationary.

4. A unit for feeding a bead stream as in claim 2 characterized in that the guiding channel (5B) of the first guiding plate (5') forms a plurality of guiding chambers (22, 22', 22") with a plurality of the guiding channels (6B, 6C) of the second guiding plate (6').

\* \* \* \* \*